United States Patent
Grydgaard et al.

(10) Patent No.: US 8,448,778 B2
(45) Date of Patent: May 28, 2013

(54) DEVICE FOR DIVIDING A FLOW OF LUMPY MATERIAL INTO TWO SUB-FLOWS

(75) Inventors: Palle Erik Grydgaard, Holbaek (DK); Richard Eimert, Kopenhamn V (DK); Stig Jensen, Holbaek (DK)

(73) Assignee: FLSmidth A/S, Valby (DK)

( * ) Notice: Subject to any disclaimer, the term of this patent is extended or adjusted under 35 U.S.C. 154(b) by 351 days.

(21) Appl. No.: 12/921,655

(22) PCT Filed: Feb. 3, 2009

(86) PCT No.: PCT/EP2009/051189
§ 371 (c)(1),
(2), (4) Date: Oct. 21, 2010

(87) PCT Pub. No.: WO2009/112311
PCT Pub. Date: Sep. 17, 2009

(65) Prior Publication Data
US 2011/0048558 A1    Mar. 3, 2011

(30) Foreign Application Priority Data

Mar. 11, 2008    (DK) .................................. 2008 00364

(51) Int. Cl.
*B65G 47/72*    (2006.01)
(52) U.S. Cl.
USPC ......................................... 198/560; 198/364
(58) Field of Classification Search
USPC ................. 198/359, 360, 364, 442, 541, 560, 198/569; 193/14, 23, 29, 31 R, 31 A
See application file for complete search history.

(56) References Cited

U.S. PATENT DOCUMENTS

| | | | | |
|---|---|---|---|---|
| 2,835,374 A | * | 5/1958 | Engels et al. | 198/442 |
| 3,009,586 A | * | 11/1961 | Isbrandtsen et al. | 414/142.4 |
| 3,319,768 A | * | 5/1967 | Holzhauer et al. | 222/56 |
| 3,731,397 A | * | 5/1973 | Kayatz et al. | 34/164 |
| 4,051,948 A | * | 10/1977 | Sackett, Sr. | 198/550.4 |
| 4,377,230 A | * | 3/1983 | Burkner | 198/525 |
| 5,638,938 A | * | 6/1997 | Lazzarotti et al. | 198/445 |
| 6,138,817 A | * | 10/2000 | Hjalmarsson et al. | 198/367.1 |
| 6,591,972 B1 | * | 7/2003 | Forrest | 198/532 |

FOREIGN PATENT DOCUMENTS

| | | |
|---|---|---|
| DE | 931879 C | 8/1955 |
| DE | 1181124 B | 11/1964 |
| JP | 58212518 A | 12/1983 |
| KR | 20020049179 A | 6/2002 |

OTHER PUBLICATIONS

Written Opinion of the International Searching Authority for PCT/EP2009/051189 (Form PCT/ISA/237).
International Search Report for PCT/EP2009/051189 (Form PCT/ISA/210).

* cited by examiner

*Primary Examiner* — Mark A Deuble
(74) *Attorney, Agent, or Firm* — Buchanan Ingersoll & Rooney PC

(57) ABSTRACT

A device for dividing a flow of lumpy material into two sub-flows comprises a dividing mechanism which comprises a dividing edge for splitting the material flow into two sub-flows, an apparatus for directing the material to the dividing mechanism and an apparatus for diverting the two sub-flows away from the dividing mechanism. The dividing edge can be moved back and forth in its longitudinal direction following its own track. Embodiments of the device can permit the wear on the dividing edge to be more evenly distributed and the service life of the device may thereby be increased.

19 Claims, 1 Drawing Sheet

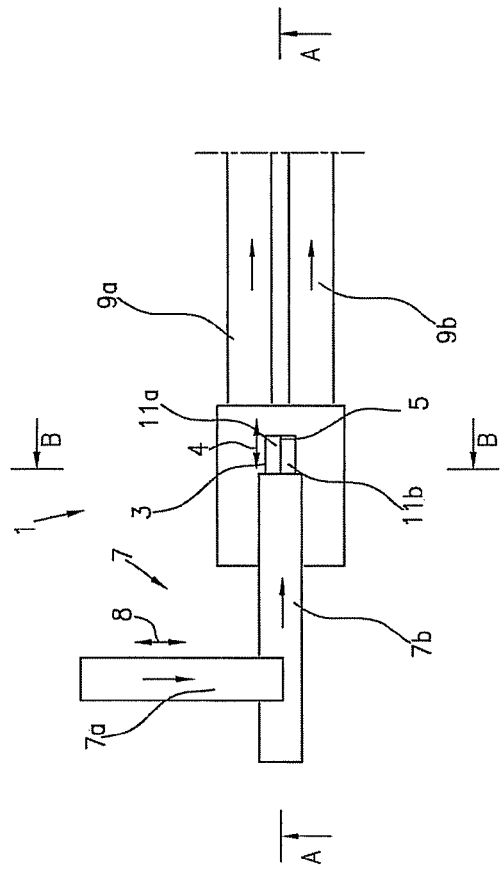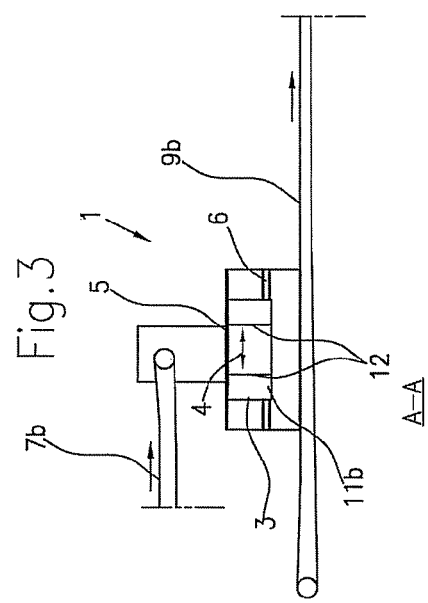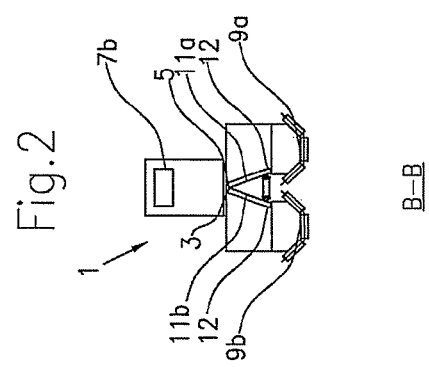

DEVICE FOR DIVIDING A FLOW OF LUMPY MATERIAL INTO TWO SUB-FLOWS

CROSS-REFERENCE TO RELATED APPLICATIONS

This application is the United States national stage under 35 U.S.C. §371 of International Application No. PCT/EP2009/051189, filed on Feb. 3, 2009, claiming priority to Danish Application No. PA 2008 00364, filed on Mar. 11, 2008. Both of those applications are incorporated by reference herein.

FIELD OF INVENTION

The present invention relates to a device for dividing a flow of lumpy material into two sub-flows, said device comprising a dividing mechanism, which comprises a dividing edge for splitting the material flow into two sub-flows, an apparatus for directing the material flow to the dividing mechanism and an apparatus for diverting the two sub-flows away from the dividing mechanism.

BACKGROUND OF THE INVENTION

Devices of the above mentioned kind are well known. In connection with the operation of such a device, the material flow which is to be divided will quite often not be evenly distributed across the length of the dividing edge, and this means that the material strikes some areas more frequently than others. As a result, there will also be variations in the wear on the dividing edge across its length, which is a significant disadvantage in regard to the service life of the dividing edge and thus the actual time of operation of the device between two shutdowns for maintenance.

SUMMARY OF THE INVENTION

It is the object of the present invention to provide a device of the kind mentioned in the introduction by means of which the wear on the dividing edge will be more evenly distributed, thereby increasing its service life.

This is achieved by means of a device of the kind mentioned above and being characterized in that the dividing edge can be moved back and forth in its longitudinal direction following its own track.

Embodiments of the device may permit the wear on the dividing edge to be more evenly distributed and the service life of the device may thereby be increased.

In certain cases it may be desirable to divert the divided material flows in a direction which is perpendicular to the dividing edge so as to provide the space necessary to accommodate the apparatus for diverting the sub-flows away from the dividing mechanism. In such instances the dividing mechanism may comprise an inclined plate or chute on one or both sides of the dividing edge. The plate(s) or chute(s) provided should preferably be arranged with a capability to follow the backward and forward movement of the dividing edge, so that the wear on the plate(s) or chute(s) is also more evenly distributed.

In connection with the handling of sticky materials at, for example, a cement manufacturing plant the excavated, sticky materials are typically kept at a store from where they are directly transported to e.g. a drier, crusher or a vertical mill. In instances where the cement manufacturing plant comprises two production lines, a set of intermediate bins have traditionally been used for dividing the material flow, said bins being alternately filled in ordinary manner, and being equipped with extraction devices. However, the attendant disadvantage is that, particularly for materials having a high moisture content and a low temperature, problems will often occur in the form of clogging of material in the intermediate bins. If the dividing mechanism, which is described above, and comprising a dividing edge for dividing the material flow into two sub-flows is to be used for dividing a flow of sticky materials, problems are likely to occur within a relatively short period of time in the form of clogging of the dividing edge and any inclined plate(s), if any. It is therefore preferred that the dividing mechanism comprises an apparatus for removing clogged materials from the dividing edge and inclined plates or chutes, if any. As a result, it will be possible to divide sticky material in sub-flows without any need for intermediate bins and extraction devices, while simultaneously avoiding operational downtime because of clogging problems.

The apparatus for removing sticky materials from the dividing edge and any inclined plates or chutes may in principle comprise appropriate means such as compressed air, water flushing, rapping mechanism etc. However, it is preferred that the apparatus comprise at least a stationary scraper which is located in immediate proximity of the dividing edge and inclined plates or chutes, if any. This will cause sticky materials to be scraped off during the reciprocating movement of the dividing edge and any inclined plates or chutes.

The apparatus for directing the material flow to the dividing mechanism may in a traditional manner comprise a swivel-type belt conveyor which makes it possible to vary continuously the relationship between the two sub-flows during operation, simply by swinging the belt conveyor to one or the other side. However, a disadvantage of a swivel-type belt conveyor is that sticky materials may get into contact not only with the dividing edge but also with the walls of the dividing mechanism, particularly when the swivel-type belt conveyor is in one of its outermost positions, i.e. where the material is directed exclusively to one sub-flow. It is therefore preferred that the apparatus comprise at least a first and a second belt conveyor being mounted substantially perpendicular relative to each other, and being capable of reciprocating movement as an integral unit in the longitudinal direction of the first belt conveyor where the first belt conveyor is mounted substantially perpendicular to the dividing edge and with the second conveyor accordingly being mounted in direct extension of the dividing edge. This will allow the relationship between the two sub-flow to be continuously varied during operation by moving the two belt conveyors as an integral unit in either directions perpendicular relative to the dividing edge without any risk of sticky materials getting into contact with the walls of the dividing mechanism.

Other details, objects, and advantages of the invention will become apparent as the following description of certain present preferred embodiments thereof and certain present preferred methods of practicing the same proceeds.

BRIEF DESCRIPTION OF THE DRAWINGS

The invention will now be explained in further details with reference to the drawing being diagrammatical and where;

FIG. 1 shows, viewed from the top, an embodiment of a device according to the invention for dividing a material flow, and FIG. 2 shows a cross-sectional view of the embodiment of the device shown in FIG. 1, and FIG. 3 shows a side view of the embodiment of the device shown in FIG. 1.

DETAILED DESCRIPTION OF PRESENT PREFERRED EMBODIMENTS

The FIGS. 1 to 3 show a device 1 for dividing a flow of lumpy material into two sub-flows, said device comprises a dividing mechanism 3, which comprises a dividing edge 5 for splitting the material flow into two sub-flows, means in the form of a belt conveyor 7 directing the material flow to the dividing mechanism 3 and means in the form of conveyor belt 9a and 9b for diverting the two sub-flows away from the dividing mechanism.

In the shown embodiment the dividing mechanism also comprises two oppositely placed plates or chutes 11a and 11b which divert the divided material flows away from the dividing edge 5 in a direction towards the belt conveyor 9a and 9b.

According to the invention the dividing edge 5 is arranged in such a way that it can be moved back and forth in its longitudinal direction following its own track, as indicated by double arrow 4 in the FIGS. 1 and 3. Hence the wear on the dividing edge 5 will be distributed more evenly, thereby increasing the service of life of the device. In the embodiment shown in FIGS. 1-3 the plates or the cutes 11a and 11b are integral parts of the dividing edge 5 and hence configured for following the movement of the latter back and forth so that the wear on the plates or chutes 11a and 11b will also be distributed more evenly. The dividing mechanism 3 may for example move or roll back and forth on rails 6.

For scraping-off of sticky materials, the device 1 also comprises in the shown embodiment a number of stationary scrapers 12, see the FIGS. 2 and 3, which are located opposite the dividing edge 5 and the inclined plates or chutes 11a and 11b so that the sticky materials are scraped off when the dividing edge 5 and the inclined plates or chutes 11a and 11b are moved back and forth.

The means 7 for directing the material flow to the dividing mechanism 3 comprises in the shown embodiment a first and a second belt conveyor 7a and 7b, which are mounted substantially perpendicular relative to one another, with capability of moving back and forth as an integral unit in the longitudinal direction of the first belt conveyor. The first belt conveyor 7a is mounted substantially perpendicular to the diving edge 5, whereas the second belt conveyor 7b is mounted in direct extension of the dividing edge 5. Hence the relationship between the two flow-streams 9a and 9b can be continuously varied by moving the two belt conveyors 7a and 7b as an integral unit in either direction perpendicular to the dividing edge 5, as indicated by double arrow 8.

The means 7 may alternatively comprise a swivel-type belt conveyor (not shown) which makes it possible to continuously vary the relationship between the two sub-flows during operation simply by swinging the belt conveyor to one or the other side.

While certain present preferred embodiments of the device for dividing a flow of lumpy material into at least two sub-flows and certain embodiments of methods of practicing the same have been shown and described, it is to be distinctly understood that the invention is not limited thereto but may be otherwise variously embodied and practiced within the scope of the following claims.

The invention claimed is:

1. A device for dividing a flow of lumpy material into two sub-flows comprising:
a dividing mechanism comprising a dividing edge for splitting the flow of lumpy material into two sub-flows, the dividing edge having at least one track and being moveable back and forth in a longitudinal direction of the dividing edge via the at least one track;
an apparatus to direct the flow of lumpy material to the dividing mechanism; and
an apparatus to divert the two sub-flows away from the dividing mechanism.

2. A device according to claim 1 wherein the dividing mechanism comprises at least one inclined plate or at least one chute on one or both sides of the dividing edge.

3. A device according to claim 2 wherein the at least one inclined plate or at least one chute is arranged so as to follow backward and forward movement of the dividing edge.

4. A device according to claim 2 wherein the dividing mechanism comprises a mechanism to remove clogged material from the dividing edge and the at least one inclined plate or at least one chute.

5. A device according to claim 4 wherein the mechanism to remove clogged material from the dividing edge and the at least one inclined plate or at least one chute comprises at least a stationary scraper located adjacent to the dividing edge and the at least one inclined plate or at least one chute.

6. A device according to claim 1 wherein the apparatus to direct the flow of lumpy material to the dividing mechanism comprises at least a first belt conveyor and a second belt conveyor, the first and second belt conveyors being mounted substantially perpendicular relative to each other and being capable of reciprocating movement as an integral unit in a longitudinal direction of the first belt conveyor, the first belt conveyor being mounted substantially perpendicular to the dividing edge and the second belt conveyor being mounted such that the second belt conveyor is a direct extension of the dividing edge.

7. A device according to claim 1 wherein the apparatus to direct the flow of lumpy material to the dividing mechanism comprises at least a first belt conveyor and a second belt conveyor, the first and second belt conveyors being mounted substantially perpendicular relative to each other and being capable of reciprocating movement as an integral unit in a longitudinal direction of the first belt conveyor, the second belt conveyor being mounted such that the second belt conveyor feeds material to the dividing edge.

8. A device for dividing a flow of lumpy material into at least two sub-flows comprising:
a dividing mechanism comprising a dividing edge for splitting the flow of lumpy material into at least two sub-flows, the dividing edge having at least one track and being moveable back and forth along a path defined by the at least one track;
an apparatus to direct the flow of lumpy material to the dividing mechanism, the apparatus to direct the flow of lumpy material comprising a first conveyor belt and a second conveyor belt, the first conveyor belt being mounted such that material moved by the first conveyor belt moves in a direction that is substantially perpendicular to the dividing edge and the second conveyor belt being mounted such that the second conveyor belt moves material to feed the material to the dividing edge; and
an apparatus to divert the at least two sub-flows away from the dividing mechanism; and
wherein the first belt conveyor and second belt conveyor are mounted substantially perpendicular relative to each other and reciprocatingly move as an integral unit.

9. The device of claim 8 wherein the dividing edge of the dividing mechanism is comprised of at least one chute.

10. The device of claim 8 wherein the dividing edge of the dividing mechanism is comprised of at least one inclined plate.

11. The device of claim 8 further comprising a mechanism to remove clogged material from the dividing edge.

12. The device of claim 11 wherein the mechanism to remove clogged material from the dividing edge is comprised of at least one scraper positioned adjacent to the dividing edge.

13. A device for dividing a flow of lumpy material into at least two sub-flows comprising:
   a dividing mechanism comprising a dividing edge for splitting the flow of lumpy material into at least two sub-flows, the dividing edge having at least one track and being moveable back and forth along a path defined by the at least one track;
   an apparatus to direct the flow of lumpy material to the dividing mechanism, the apparatus to direct the flow of lumpy material comprising a first conveyor belt and a second conveyor belt, the first conveyor belt being mounted such that material moved by the first conveyor belt moves in a direction that is substantially perpendicular to the dividing edge and the second conveyor belt being mounted such that the second conveyor belt moves material to feed the material to the dividing edge; and
   an apparatus to divert the at least two sub-flows away from the dividing mechanism; and
   a mechanism to remove clogged material from the dividing edge comprised of at least one scraper positioned adjacent to the dividing edge, wherein the at least one scraper is at least one stationary scraper positioned to scrape clogged material from the dividing edge when the dividing edge is moved along the at least one track and wherein the at least one track is comprised of a track.

14. The device of claim 13 wherein the dividing edge of the dividing mechanism is comprised of one of: at least one inclined plate and at least one chute.

15. The device of claim 13 wherein the first conveyor belt moves material in a direction that is perpendicular to the direction along which the second conveyor belt moves the material.

16. The device of claim 8 wherein the apparatus to divert the at least two sub-flows away from the dividing mechanism is comprised of at least two flow streams of material and wherein the second conveyor belt is also moveable such that the second conveyor belt is moveable in a direction that is perpendicular to a direction in which the material moved by the second conveyor belt moves.

17. The device of claim 8 wherein the first conveyor belt is moveable to continuously vary a relationship between the two sub-flows.

18. A device for dividing a flow of lumpy material into two sub-flows comprising:
   a dividing mechanism comprising a dividing edge for splitting the flow of material into two sub-flows, the dividing edge having at least one track and being moveable back and forth along a path defined by the at least one track;
   an apparatus to direct the flow of material to the dividing mechanism, the apparatus to direct flow of material comprising a first conveyor belt device, the first conveyor belt device being mounted such that the first conveyor belt device moves in a direction to feed the material to the dividing edge; and
   an apparatus to divert the two sub-flows away from the dividing mechanism; and
   wherein the first conveyor belt device is moveable to continuously vary a relationship between the two sub-flows; and
   wherein the first conveyor belt device is comprised of a first conveyor belt and a second conveyor belt, the first conveyor belt being mounted such that material moved by the first conveyor belt is fed to the second conveyor belt and the second conveyor belt being mounted such that the second conveyor belt moves material to the dividing edge, and wherein the first and second conveyor belts are also moveable such that the second conveyor belt is moveable in a direction that is perpendicular to a direction in which the material moved by the second conveyor belt moves.

19. The device of claim 13 wherein the first conveyor belt is moveable to continuously vary a relationship between the two sub-flows.

* * * * *